2,763,561

CEMENT MORTAR COMPOSITION OF MATTER

Henry Prather Burney, Jr., and John Lawson Felder,
San Antonio, Tex.

No Drawing. Application May 13, 1952,
Serial No. 287,619

3 Claims. (Cl. 106—99)

The present invention relates to a cementitious bonding composition of matter which contains a critical percentage of asbestos fiber for imparting to such composition desirable characteristics.

A disadvantage in using as a mortar mix a material containing a high percentage of cementitious material, such as Portland cement, is that the Portland cement has a very low moisture retention characteristic. Thus a bonding material incorporating therein Portland cement tends to quickly lose moisture required for hydration and proper curing, making the resulting mix or bond lose some of its strength.

The rapid loss of moisture from the cementitious composition of matter also causes cracks which in turn further decreases the strength of the bonding material and makes such material more susceptible to water passage therethrough. Also a problem heretofore encountered with a bonding or cementitious mortar mix utilizing a high percentage of Portland cement, has been that the material will be weak, powdery and have relatively little, if any, flexibility when dry.

The present invention is therefore directed to a bonding material or composition of matter in a dry powder form which when mixed with water provides a bonding material that has the proper water retention characteristics to eliminate or overcome the difficulties encountered by the presence of a high percentage of Portland cement in the mixture.

Still another object of the invention is to produce a cementitious bonding material incorporating therein a critical percentage of water retaining material so as to provide a bonding material that will give an instant bond between a masonry unit and the surface to which it is applied.

Still another object of the invention is to produce a cementitious bonding material incorporating therein a critical percentage of water retaining material so as to provide a bonding material that will give an instant bond between a masonry unit and the surface to which it is applied, while on the other hand retaining the correct amount of water within the material to completely hydrate the cement therein to give the necessary strength to the bonding material.

A still further object of the invention is to provide a cementitious bonding material or mortar which comprises substantially 94 lbs. Portland cement, 15 lbs. of 200 mesh silica and 1 to 5 lbs. asbestos fiber, depending upon the grade of asbestos fiber used.

Still another object of the invention is to incorporate in a mortar mix including about 90% Portland cement and 8% 200 mesh silica, 2% of clean asbestos fiber so as to retain the water in the mix a proper length of time to allow such mix to cure properly, flow easily and yet set almost immediately.

Still another object of the invention is to incorporate in a cement mortar mix including about 85 to 90% Portland cement and 9 to 13% silica, 1 to 2% of asbestos fiber so that the resulting composition when mixed with water can be pumped through a hose about 1 inch in diameter.

Still another object of the invention is to incorporate in a cement mortar mix including about 85 to 90% Portland cement and 9 to 13% silica, 1 to 2% of asbestos fiber so that the resulting composition when mixed with water can be pumped through a hose about 1 inch in diameter, whereby the mortar can be readily applied and can remain in the hose over a substantial period of time, such as 30 minutes, and yet remain fluid enough to not clog the hose.

Still another object of the invention is to provide a mortar or bonding material for application between masonry units and a surface on which such units are to be supported, such mortar mix having asbestos fibers therein to impart mobility to the mortar and yet allow almost instant bonding between the masonry units and the support surface.

A further object of the invention is to provide a bonding material for applying ordinary masonry units only approximately ¼ standard thickness directly to a vertical surface, with each unit being bonded to and supported by the vertical surface to which it is bonded.

A still further object of the invention is to provide a bonding material or mortar mix which is pliable and yet sets almost immediately so that masonry units may be applied to a vertical well, starting at the upper portion of such well surface and working downwardly as opposed to the ordinary manner of laying masonry units from the bottom and working up.

Yet a further object of the invention is to incorporate asbestos fiber in a cement mortar mix to prevent the mortar from having shrinkage cracks which result from the mortar losing its moisture too fast.

A further object of the invention is to incorporate a small percentage of asbestos fiber in a mortar mix so that such fibers form an interlocking framework within the mortar when it dries which framework is flexible and conforms with movement of such body.

A further object of the invention is to add one to two percent of asbestos fibers to a mortar mix so that the fibers increase the flexibility of the body of dried mortar.

Other objects and advantages of the invention will become more apparent from a consideration of the following detailed discussion of our invention.

We have discovered that the quality of a mortar mix containing a high percentage of cement can be greatly enhanced by incorporating in the mortar mix a percentage of asbestos fiber, which percentage is critical to the results obtained depending upon the quality of asbestos fiber used.

For example, we have found that a composition may be suitably produced by mixing in substantially the following proportions: 94 lbs. of Portland cement, 15 lbs. of 200 mesh silica and 1 lb. of Canadian No. 5 asbestos fiber. The components and percentages are mixed in powder form. When it is desired to apply some of the mixture, water is added to produce a resulting mixture of desired consistency.

The resulting bonding material or mortar is applied to the back of the masonry unit and when the mortar thereon is pressed against the vertical support surface to which the unit is being applied the bonding material squeezes out past the edge of the masonry unit to form the joint. The masonry unit and the wall surface then sucks some of the moisture out of the bonding material thus effecting an instant adherence between the wall surface and the masonry unit.

Particular attention is directed to the fact that the asbestos fiber in the mortar mix helps to retain some of the moisture in the cement so as to obtain complete hydration and proper curing of the cement. The asbestos fiber also acts to make the mortar mix pliable and readily movable from the point of mixing to the point of application through a rubber hose as small as one inch in diameter.

We have further discovered that the percentage of asbestos fiber used in the mixture is critical in obtaining a desired water retention characteristic on the one hand and an instant bonding characteristic on the other hand. More particularly we have discovered that the percentage of asbestos fiber is critical within a range of one to five percent, based on the total mixture and depending upon the grade of asbestos used.

For example if a low grade asbestos sand (with a high percentage of sand such as 20 to 30%) is used it may be possible to incorporate in the mortar as high as five percent of the asbestos sand. In this event the cement would comprise approximately 85% and the silica content would comprise about 10% of the total mixture.

However, if a clean asbestos fiber is used, such as Canadian No. 5 fiber, then it is desirable to use only approximately 1 to 2% asbestos in the total mixture. The Canadian No. 5 fiber is a fiber approximately 3/16 of an inch in length; however, grade No. 7 (shorts 1/16 inch or less), grade No. 6, and grade No. 4 can be used in the mixture. The asbestos fiber length is not critical and if the asbestos is clean and contains no silica, as previously mentioned, then it is desirable to use approximately one to two percent asbestos.

It is to be noted that all percentages in this application are based on weight unless otherwise stated.

The 200 mesh silica in the composition helps to provide high early strength in the Portland cement and it appears to act as a catalytic agent in the formation of tri-calcium silicate in the hydration of the cement. The silica also helps to eliminate variation in the water retention of the Portland cement in that the silica, since it has practically no water retention, lowers the water retention of the Portland cement by admixture action. This in turn tends to reduced or eliminate fluctuation of the water retention characteristic of the bonding material and keeps the water retention of the bonding material more accurate.

If the bonding material retains the water too long then the instant adhering action of the bonding material to the vertical wall support surface is very considerably retarded. On the other hand if too little moisture retention is present in the bonding material then the masonry unit adheres to the wall surface so rapidly that the applicators do not have time to position the unit and smooth the mortar joint. Also the rapid drying or rapid loss of water from the mix will cause cracks in the mortar and it will be weak and dusty when dry. In cold weather, the retention of moisture becomes more important since the cement gathers strength more slowly and the water of hydration must be present longer.

Properly hydrated bonding material or mortar mix has a large degree of flexibility and can contact and expand relatively easily due to changes in temperature and weather. Also it should be noted that the asbestos fiber tends to increase the flexibility characteristic of the mortar. Apparently this is because the fibers of asbestos act as interlocking members throughout the dry body of mortar and can move in response to movement of the body of mortar more readily than mortar mix without asbestos fibers.

The present invention has proved extremely satisfactory in commercial application. A composition comprising substantially the proportions and the materials hereby described produces a bonding material which has the desirable drying characteristics without inhibiting the quick setting and flexible and mobile characteristics of the mortar mix. Also it should be noted that the present mortar mix has been successively used commercially to apply a masonry unit to a vertical wall surface and build a complete masonry front on such surface by starting at the top thereof and working down. The mortar when dry appears to be fully hydrated, properly cured, crack free and non-dusty. Also the resulting mortar is much more mobile during application and is more flexible after drying than dried bodies of mortar mixes of previously known compositions.

The preferred embodiment of the composition includes clean asbestos fibers, in the critical percentage range of approximately one to two percent. If desired a suitable coloring agent or pigment may be added to the mixture. Of course, it should be noted that a pigment which does not affect the water retention characteristic of the asbestos or of the resulting mixture should be used.

Another mineral material which can be used in place of asbestos fiber is vermiculite. In this event the percentage may vary somewhat from that given for asbestos in order to obtain a composition having the same flow properties and water retention characteristics.

Broadly the invention contemplates a high Portland cement content mortar mix which contains a critical amount of moisture retaining material, as asbestos fibers, so as to provide a mortar mix that can be easily worked and which forms a quick bond without endangering the strength of the mortar when dry.

What is claimed is:

1. A composition of matter adapted for use as a water retaining bonding material for applying masonry units to a surface consisting essentially of ninety-four pounds of Portland cement, fifteen pounds of silica of at least 200 mesh, one to five pounds of asbestos fiber and color one to five pounds.

2. A composition of matter adapted for use as a water retaining bonding material for applying masonry units to a surface consisting essentially of eighty-five to ninety percent Portland cement, asbestos fiber one to five percent, and ten to fifteen percent silica of at least 200 mesh.

3. A composition of matter for use as a bonding mix which mix is mobile for pumping through hoses and which forms a permanent set quickly while retaining enough water to complete hydration of the mixture to increase the strength thereof and eliminate cracking of the mix while it hardens, consisting essentially of approximately ninety-four pounds of Portland cement, approximately fifteen pounds of silica of at least 200 mesh. and approximately one to five pounds of asbestos fiber.

References Cited in the file of this patent

UNITED STATES PATENTS

| | | |
|---|---|---|
| 837,169 | Winslow | Nov. 27, 1906 |
| 1,000,944 | Rouhoff | Aug. 15, 1911 |
| 1,456,985 | Kleist | May 29, 1923 |
| 2,198,800 | Badollet | Apr. 30, 1940 |
| 2,323,835 | Mooney | July 6, 1943 |
| 2,410,954 | Sharp | Nov. 12, 1946 |
| 2,446,990 | Schuetz | Aug. 10, 1948 |
| 2,568,023 | Perry | Sept. 18, 1951 |

FOREIGN PATENTS

| | | |
|---|---|---|
| 688,203 | Great Britain | Mar. 4, 1953 |